United States Patent [19]

Colson

[11] Patent Number: 4,598,731
[45] Date of Patent: Jul. 8, 1986

[54] VALVE ASSEMBLY FOR PLACEMENT OVER A CAPPED, STUB-OUT WHICH IS UNDER WATER PRESSURE IN A DWELLING

[76] Inventor: Dale G. Colson, 107 Aspen La., Pacific, Wash. 98047

[21] Appl. No.: 792,691

[22] Filed: Oct. 28, 1985

[51] Int. Cl.$^4$ .............................................. F16K 43/00
[52] U.S. Cl. ..................................... 137/318; 222/83; 285/197
[58] Field of Search ................. 137/317, 318, 315; 222/81, 83, 89; 285/197, 198, 199

[56] References Cited

U.S. PATENT DOCUMENTS

| | | | |
|---|---|---|---|
| 2,391,582 | 12/1945 | Martin | 222/83 |
| 2,391,583 | 12/1945 | Martin | 222/83 |
| 2,756,486 | 7/1956 | Smith | 137/318 |
| 2,827,913 | 3/1958 | Wagner | 137/318 |
| 2,875,777 | 3/1959 | Lacart | 137/318 |
| 3,038,490 | 6/1962 | Yocum | 137/318 |
| 3,438,656 | 4/1969 | Fritch | 137/318 |
| 3,448,779 | 6/1969 | Horwitt | 137/318 |
| 3,460,553 | 8/1969 | Leopold, Jr. et al. | 137/318 |
| 3,460,721 | 8/1969 | Hamel et al. | 137/318 |
| 4,134,940 | 1/1979 | Sherman | 137/318 |

Primary Examiner—G. L. Walton
Attorney, Agent, or Firm—Roy E. Mattern, Jr.

[57] ABSTRACT

In installing angle stop valves by a plumbing fixture such as below a sink, in a dwelling, where two capped stub-out pipes extend out from the wall and have respective hot and cold water under pressure, a new angle stop valve of this valve assembly is endwise directed over the sealing cap of the stub-out pipe, and also partially over the stub-out pipe, where it is then secured to the stub-out pipe. During and after this assembly its internal sealing gaskets bear against the stub-out pipe. When water is needed in an installed sink, the handle of this new angle stop valve is rotated causing its self-contained stainless steel pin to pierce the respective sealing end cap to create an orifice. Upon the withdrawal of this stainless steel pin, the water flows from the stub-out through the unsealed end cap, through this valve and on to the sink faucet. At all times during this installation the main water system of the dwelling remains turned on under pressure.

14 Claims, 7 Drawing Figures

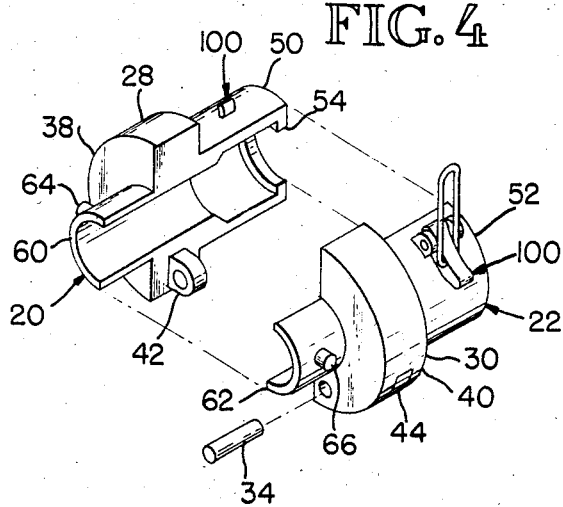
FIG. 4
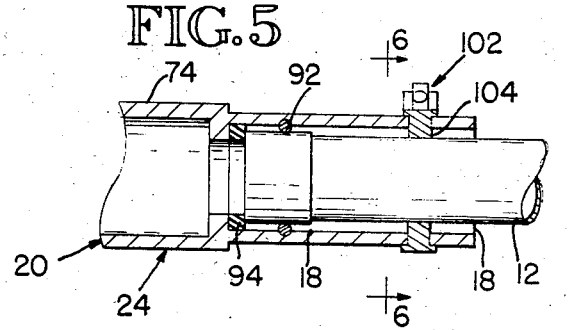
FIG. 5
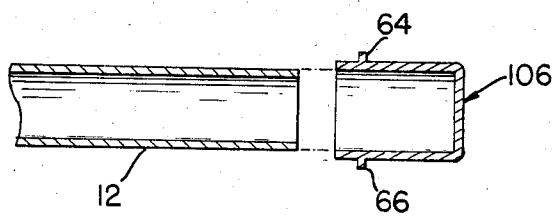
FIG. 7
FIG. 6

VALVE ASSEMBLY FOR PLACEMENT OVER A CAPPED, STUB-OUT WHICH IS UNDER WATER PRESSURE IN A DWELLING

BACKGROUND

The current practice during the construction of dwellings is to complete the rough in plumbing at a bathroom or kitchen plumbing fixture location by providing a stub-out pipe, generally a smaller diameter copper pipe, and sealably capping the exit, so the rough plumbing may be checked for leaks, etc. Then later, when other plumbers return to install the bathroom and kitchen fixtures and if the water is on throughout a dwelling, they spend considerable time shutting off the main water valves and draining the respective stub-out pipes before installing the plumbing fixtures. Time is continued to be lost in turning the main valve on again, and even more time is lost if leaks remain when a plumbing fixture is improperly installed.

A review of possibly pertinent U.S. patents and products offered in the marketplace indicates there are no plumbing parts available which may be installed while the water pressure remains in a stub-out pipe, to provide a valve serving as the standard angle stop valve does, in opening and shutting the water flow to the faucets of sinks or other plumbing fixtures. The standard angle stop valve can only be installed after the water in a dwelling is shut off.

Among the U.S. patents reviewed, Robert M. Sherman in 1979, in his U.S. Pat. No. 4,134,940 in describing and illustrating his humidifier adapater with an audio relief valve, shows in FIG. 4 a piercing element entering a sealed upper end of a filler tube. Mr. Sherman, however, does not suggest in any other way any of the aspects of valve assembly described herein.

SUMMARY

A valve assembly is available to be used, without turning off the water in a dwelling, to secure new angle stop valves in place at capped stub-out pipe locations. A hinged anchoring clamp of this valve assembly is pivoted open. Then it is installed around a respective stub-out pipe, commencing adjacent to the sealing end cap. Thereafter it is pivoted back around the stub-out pipe and tightened in place.

Subsequently, the new angle stop valve of this valve assembly is endwise directed over the sealing cap of the stub-out pipe, and is also directed beyond to partially extend over the end of the secured hinged anchoring clamp. It is then rotated and locked into position, via the use of an axial lock subassembly. During this installation an internal O-ring gasket of this new angle stop valve is positioned to bear against the circumference of the now punctured sealing cap, and an internal ring abutment gasket is positioned to bear against the end of this sealing cap. Together these seals insure against any water leaking around the end of the stub-out.

After the balance of the piping from this valve assembly to a faucet of a plumbing fixture, such as a sink, is completed, then a handle of this valve assembly is rotated to move the valve stem inwardly, causing a pointed stainless steel pin of this valve stem to sufficiently puncture the end of the sealing end cap, to thereby create a full flow orifice. Thereafter, this handle is rotated in the other direction and the water under pressure flows through the newly created orifice, through this new angle stop valve, and on through to the faucet of the plumbing fixture. Subsequent stopping of the water flow occurs as the handle is rotated in the opposite closing rotation, and a stem gasket on the valve stem contacts an integral circumferential stop on the interior of the valve assembly.

In another embodiment a surrounding subassembly of a gripping ring is used, instead of a hinged anchoring clamp. In yet another embodiment, if a new sealing cap is used with locking pins, then the new angle stop valve is directly connected to the stub-out pipe.

In comparing the personnel times involved in installing new plumbing fixtures such as sinks, when a conventional angle stop valve is utilized versus when this valve assembly with its new angle top valve is utilized, there is saving of personnel time in the neighborhood of eighty seven percent. This is true when no leaks may be observed following either installation. The largest saving of personnel time occurs because there is no need to shut the water supply off within the dwelling, when this valve assembly is installed.

DRAWINGS

This valve assembly for placement over a capped stub-out when the water pressure remains on in a dwelling is illustrated in the drawings, wherein:

FIG. 4 is a perspective view of another embodiment of the subassembly of the hinged anchoring clamp, using a toggle securing subassembly;

FIG. 5 is a partial side view, with most components being shown in section, except the capped stub-out pipe, to illustrate another embodiment using only a contractible encircling clamp, and not employing the other components of the subassembly of an anchoring clamp.

Figure 1:
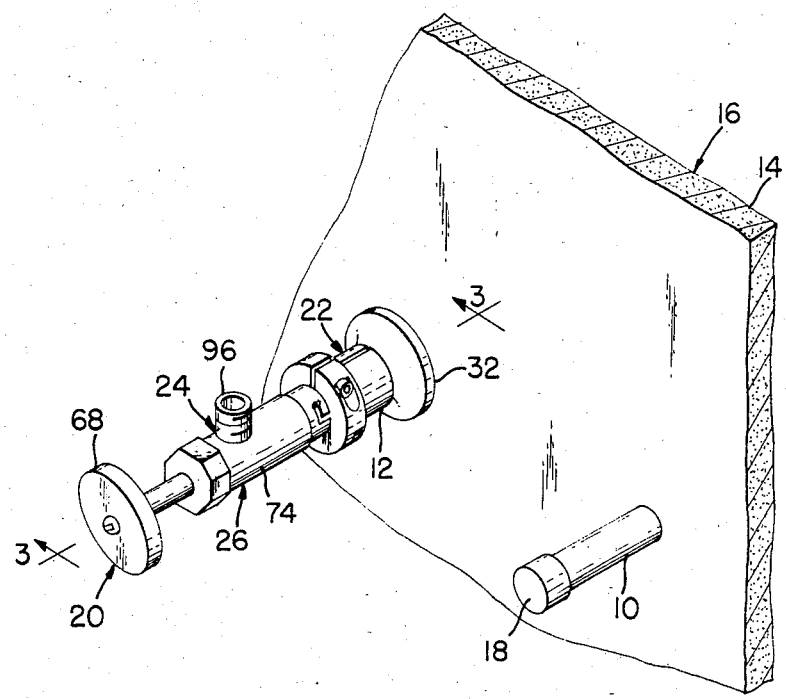
FIG. 1 is a perspective view of a portion of a wall of a dwelling located below a plumbing fixture, where two capped stub-out pipes have been previously installed during the rough in plumbing of a dwelling, and thereafter one of them has received this valve assembly, and soon another one will be installed on the other capped stub-out pipe.
Figure 2:
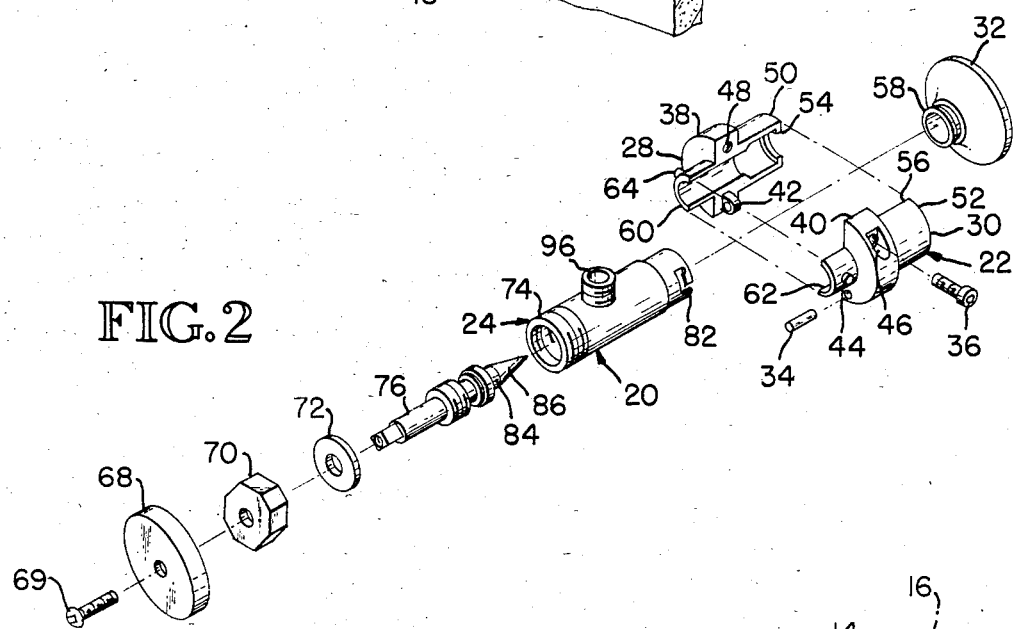
FIG. 2 is an exploded perspective view of the components of one embodiment of this valve assembly which are preassembled into two principal subassemblies, one being referred to as the hinged anchoring clamp, and the other being referred to as the new angle stop valve.
Figure 3:
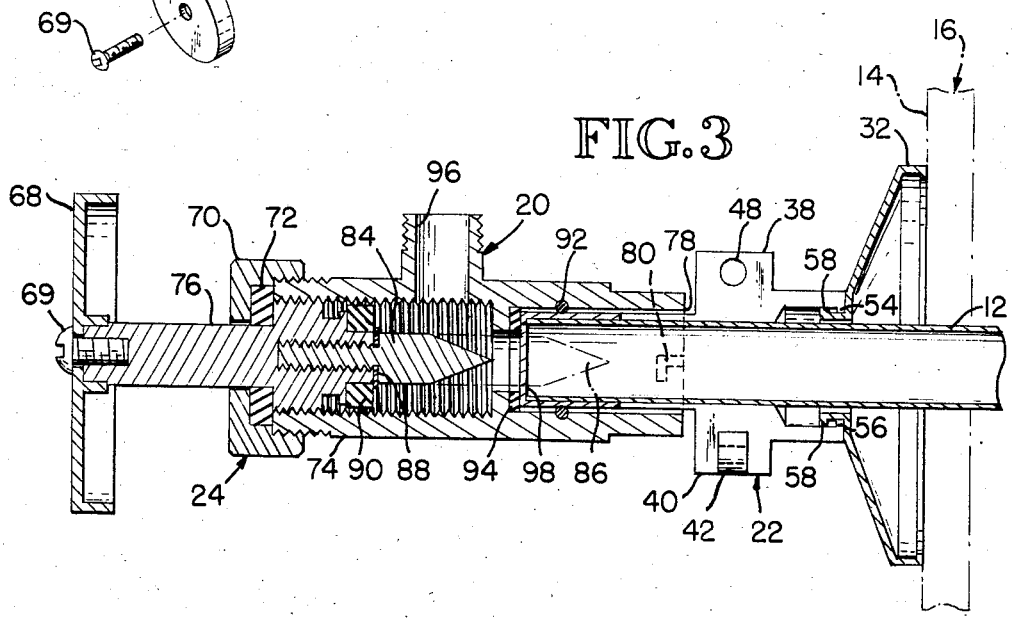
FIG. 3 is a side view, with most components being shown in section to illustrate the overall installation of this valve assembly, indicating, with phantom lines, the movement of the stainless steel pin of the valve stem through the orifice it creates in the original sealing end cap, which remains in place.

FIG. 6 is a sectional view taken along section line 6—6 of FIG. 5, illustrating how multiple radial portions of the tightened gripping ring pass through the openings in housing of this embodiment of the new angle stop valve and then they frictionally grip the stub-out pipe to hold this valve in place; and FIG. 7 is a side sectional view of a stub-out pipe about to be fitted with a new sealing cap, which has radial locking pins, so the embodiment of the new angle stop valve, shown in FIGS. 1, 2 and 3, with its locking slots may be directly secured to this stub-out pipe having these radial locking pins on the new sealing cap.

DESCRIPTION OF THE PREFERRED EMBODIMENTS

During the construction of dwellings when the roughed in plumbing has been completed and tested for leakage, the plumbing fixtures have not arrived at the construction site. Therefore for example, as shown in FIG. 1, where a sink is to be installed, stub-out cold and hot water lines 10, 12 are supported and extended through a wall 14 of a dwelling 16, and then sealed with a cap 18, so the roughed in plumbing may be thoroughly checked for leakage during the early construction of the dwelling.

Previously, when a fixture such as a sink was to be installed during the final finishing of a dwelling, plumbers had to shut off the water in the dwelling and be prepared to handle the leakage of water from the stub-out pipe when it was cut off. After the fixture was installed, the water was turned on again and hopefully there were no leaks. If there were leaks, then there was the necessity of turning off the water again and being prepared to handle the leakage of water.

Now plumbers need not cut off the water in the dwelling when they use this valve assembly 20, as shown in FIG. 1, where the subassembly of its hinged anchoring clamp 22 has been secured about the hot water line stub-out 12. Thereafter, the new subassembly 24 of the new angle stop valve 26 has been interlocked with the subassembly of the anchoring clamp 22 to complete the assembly of this valve assembly 20, while the water has remained turned on throughout the dwelling.

What occurs during this water on installation, is illustrated by observing the exploded view of FIG. 2 and the assembled sectional view of FIG. 3. The stub-out 12 is left with its cap 18 in its initial sealing position and the water remains turned on in the dwelling. First an escutcheon 32 is inserted over the stub-out 10. Then in reference to the subassembly of the anchoring clamp 22, the two halves 28, 30, which previously have been hinged together by a hinge pin 34, are opened and moved about stub-out 10, immediately adjacent to the cap 18, and then closed and secured by using threaded and capped fastener 36.

Each half 28, 30 of the subassembly of the anchoring clamp 22 is enlarged circumferentially to form a surrounding two piece integral collar 38, 40 to provide below, the hinge portions 42, 44 to receive the hinge pin 34, and to provide above, a guiding hole 46 and a threaded receiving hole 48 to receive the fastener 36. Between the two piece integral collar 38, 40 and the escutcheon 32, which is fitted around the stub-out 12 and positioned against the wall 14, each half 28, 30 of this subassembly of the anchoring clamp 22 is formed with integral one half hollow cylinder portions 50, 52 terminating in two piece interior retaining flange portions 54, 56. Together these flange portions 54, 56 fit over and around a grooved portion 58 of the escutcheon 32, as shown in FIG. 3.

At its other end, the subassembly of anchoring clamp 22 has two integral one half hollow cylinder receiving portions 60, 62 which fit directly over the stub-out 12 throughout their interiors. On their exteriors each cylinder portion 60, 62 has a radial projecting locking pin 64, 66 which upon assembly are diametrically opposite one another. As so positioned and secured, the subassembly of the anchoring clamp 22 is ready to receive the subassembly of the new angle stop valve 24.

As shown in FIGS. 2 and 3, the subassembly of the new angle stop valve 24 has conventional parts such as the handle 68, its holding fastener 69, the threaded packing nut 70, and the packing gasket 72. However, the housing 74 and the valve stem 76 are specially formed. The housing 74 is extended longitudinally to provide a hollow cylindrical portion 78 having an interior to closely slide over the cap 18 on the stub-out 12, and to provide diametrically opposed locking slot portions 80, 82. These locking pins 64, 66 on the subassembly of the anchoring clamp 22, upon the relative axial movement of the subassembly of the new angle stop valve 24, enter these slot portions 80, 82. Then upon the following relative radial movement, these locking pins 64, 66 are moved into their axial locking positions to complete the installation of this valve assembly 20 about the yet sealed stub-out 12, as shown in FIGS. 1 and 3.

Then, as observed in FIGS. 2 and 3, the valve stem 76, which may be made of brass, has a threaded central axial hole, into which is threaded a stainless steel sealing stem portion 84, which terminates in a tapered piercing point portion 86. A washer 88 is used during this assembly of the stainless steel sealing stem portion 84 with the valve stem 76 and it positions a circular gasket 90. The sealing of the extending hollow cylindrical portion 78 of the housing 74 about stub-out 12 is assured by the utilization of the O-ring 92 and another circular gasket 94.

At this time of the initial installation of the valve assembly 20, as illustrated in FIG. 3, the stainless steel stem 84 has not been axially advanced. Although the exit port 96 is open, the seal cap 18 is still doing its job keeping the water in the stub-out 12. Preferably the valve assembly 20 will so remain, until the piping and related connections are completed to install a fixture such as a sink, not shown.

Then when both valve assemblies 20 have been installed on the respective cold water stub-out 10 and the hot water stub-out 12, and all the connections are made, for example to a sink, the respective valve handles 68 are turned, thereby moving the respective tapered piercing point portions 86 through the respective caps 18, to create respective orifices 98 in these respective caps 18. Upon the opposite rotational turning of the respective valve handles 68, the stainless steel stem portions 84 are withdrawn from the respective orifices 98 and the respective flows of hot and cold water become available at respective hot and cold water faucets, not shown. Only when there is a need to replace components of these faucets or to replace a fixture, such as a sink, will these valve assemblies 20 be used to stop the supply of water otherwise coming through the respective cold stub-out 10 or the hot stub-out 12.

These valve assemblies 20 are economically useful in respect to all dwellings. Especially from the standpoint of installing fixtures throughout larger dwellings, their utilization saves many man hours during installation times. The principal savings center on the elimination of any need to turn off the main water supply valve or valves of a dwelling. Other savings are indicated by the following time study.

| | Time in Seconds Involved | |
|---|---|---|
| | Re Other Valve | Applicant's Valve |
| The Installation Activity | Assemblies | Assembly |
| Walk outside, turn off water supply, and open hosebib, | 120 | 0 |

| The Installation Activity | Time in Seconds Involved | |
|---|---|---|
| | Re Other Valve Assemblies | Applicant's Valve Assembly |
| return to area | | |
| Open package and remove valve | 15 | 15 |
| Apply pipe dope to valve | 40 | 0 |
| Cut off stub-outs | 60 | 0 |
| Catch excess water from stub-outs | 60 | 0 |
| Clean pipes | 20 | 20 |
| Install escutcheons | 20 | 1 |
| Install valves | 110 | 29 |
| Turn off valves | 10 | 15 |
| Clean off excess pipe dope | 15 | 0 |
| Walk to hosebib, turn it off, turn on the water supply, return to sink area, and check for leaks | 130 | 0 |
| Pick up tools, stub-out ends, bucket | 20 | 0 |
| Totals | 620 | 80 |

The comparison of these time summaries indicates eighty seven percent of the installation time involved in installing the other valve assemblies is saved by installing the Applicant's valve assembly.

Other embodiments of some of the components have been undertaken such as illustrated in FIGS. 4, 5 and 6. As shown in FIG. 4, after the half portion 28 and the half portion 30 of the subassembly of the anchoring clamp have been hinged together and then positioned about the stub-out 10 or 12, they are secured by using the toggle subassembly 100, instead of using the fastener 36.

As shown in FIG. 5, instead of using the locking pins 64, 66 and locking slot portions 80, 82, or toggle assembly 100 to axially hold the subassembly of the anchoring clamp 22 to the subassembly of the new angle stop valve 26, a surrounding subassembly of a tightened gripping ring 102 is used. It has multiple radial integral portions 104 which pass through openings 106 in the housing 74 of this new embodiment 27 of the new angle stop valve subassembly 24. Then these portions 104 frictionally grip the stub-out pipe to hold this valve in place.

Also as illustrated in FIG. 7, if the plain sealing caps 18 are not used, then the new sealing caps 106 with locking pins 64, 68 are used, when a dwelling is under construction. These new locking pin sealing caps 106 eliminate the need for the embodiments of the subassembly of the anchoring clamps, shown in FIGS. 1, 2, 3 and 4.

Instead the new angle stop valve 27 will have locking slot portions 80, 82 to receive directly the locking pins 64, 66 on the new sealing caps 106.

In whatever embodiment is selected, there will be the cooperative use of the subassembly of an anchoring clamp 22, or a subassembly of a surrounding gripping ring 102, with the subassembly of a new angle stop valve 24. All the embodiments will always be effectively utilized, without requiring the shut off of the water, to correctly position and secure the new angle stop valves 26 and 27.

I claim:

1. A valve assembly for installation about stub-outs having sealing caps for sealing off an open end of the stub-outs extending through a wall in a dwelling for operative installation when the water system remains turned on, comprising:

(a) a subassembly of a securing means adapted for placement about at least one of the stub-outs;

(b) a subassembly of an angle stop valve adapted for positive placement, in part, over the sealing cap and over at least an upper portion of at least one of the stub-outs and to be held by the securing means, the sealing cap sealingly abuts an interior surface of said angle stop valve to prevent any leakage within said angle stop valve; and following such positive placement, the subassembly of the angle stop valve, upon actuation of said angle stop valve to a full closure position, creates an orifice in the sealing cap of said at least one of the stub-outs, and thereafter the opening and closing of the orifice during the actuation of said angle stop valve starts and stops the water flow through the valve assembly.

2. A valve assembly, as claimed in claim 1, wherein, the subassembly of the securing means has locking pins associated with at least one of the stub-outs and locking slots on the subassembly of said angle stop valve to receive the locking pins.

3. A valve assembly, as claimed in claim 1, comprising, in addition, a piercing point in the subassembly of said angle stop valve, which upon the first full closure causes the creation of the orifice in the sealing cap of at least one of the stub-outs.

4. A valve assembly, as claimed in claim 2, comprising, in addition, a piercing point in the subassembly of said angle stop valve, which upon the first full closure cause the creation of the orifice in a sealing cap of at least one of the stub-outs.

5. A valve assembly, as claimed in claim 1, wherein the subassembly of the securing means has an encircling gripping ring with a fastener to tighten this ring about the subassembly of said angle stop valve where this subassembly of said angle stop valve is positioned around at least one of the stub-outs.

6. A valve assembly as claimed in claim 5, comprising, in addition, a piercing point in the subassembly of said angle stop valve, which upon the first full closure causes the creation of the orifice in the sealing cap of at least one of the stub-outs.

7. A valve assembly for installation about stub-outs having sealing caps for sealing off an open end of the stub-outs extending through a wall in a dwelling for operative installation when the water system remains turned on, comprising:

(a) a subassembly of an anchoring clamp adapted for placement about at least one of the stub-outs adjacent its sealing cap;

(b) a subassembly of an angle stop valve adapted for positive placement, in part, over the sealing cap and over a portion of at least one of the stub-outs and to be secured thereto by the subassembly of the anchoring clamp, the sealing cap sealingly abuts an interior surface of said angle stop valve to prevent any leakage within said angle stop valve; and following such positive placement, the angle stop valve, upon actuation of said angle stop valve to a full closure position, creates an orifice in the sealing cap of said at least one of the stub-outs, and thereafter opening and closing of the orifice during the actuation of said angle stop valve starts and stops the water flow through the valve assembly.

8. A valve assembly, as claimed in claim 7, wherein the subassembly of an anchoring clamp has two clamp sections, a hinge to initially pivotally secure these clamp sections together, and a fastener subassembly to complete the securement of the pivotal clamp sections about at least one of the stub-outs, after their initial open hinge position has been utilized in placing the subassembly of an anchoring clamp about at least one of the stub-outs.

9. A valve assembly as claimed in claim 8, comprising, in addition, a piercing point in the subassembly of said angle stop valve, which upon the first full closure causes the creation of the orifice in the sealing cap of at least one of the stub-outs.

10. A valve assembly for installation about stub-outs having sealing caps for sealing off an open end of the stub-outs extending through a wall in a dwelling for operative installation when the water system remains turned on, comprising:
  (a) the sealing caps having fastener components and adapted for sealing securement to the stub-outs;
  (b) a subassembly of an angle stop valve adapted for positive placement in part, over the sealing caps and over at least an upper portion of the stub-outs, having fastener components which interfit with the fastener components on the sealing caps, and having a piercing point, which upon actuation of said angle stop valve to a first full closure position of this valve assembly creates an orifice in the sealing caps of the stub-outs for controlling the water flow of through the valve assembly.

11. A valve assembly as claimed in claim 10, wherein the fastener components on the sealing cap are locking pins, and the fastener components on the subassembly of the angle stop valves are locking slots to receive the locking pins.

12. A valve assembly as claimed in claim 10, wherein the subassembly of the angle stop valve includes sealing means in contact with the exterior of the stub-out.

13. A valve assembly as claimed in claim 12, wherein the sealing means is an O-ring.

14. A valve assembly as claimed in claim 12, wherein the sealing means comprises an O-ring and an abutment sealing gasket.

* * * * *